(12) United States Patent
Neven et al.

(10) Patent No.: US 6,948,131 B1
(45) Date of Patent: Sep. 20, 2005

(54) COMMUNICATION SYSTEM AND METHOD INCLUDING RICH MEDIA TOOLS

(75) Inventors: Hartmut Neven, Santa Monica, CA (US); Orang Dialameh, Santa Monica, CA (US); Charles L. Blanchard, San Francisco, CA (US)

(73) Assignee: Vidiator Enterprises Inc., Nassau (BS)

( * ) Notice: Subject to any disclaimer, the term of this patent is extended or adjusted under 35 U.S.C. 154(b) by 0 days.

(21) Appl. No.: 09/520,479

(22) Filed: Mar. 8, 2000

(51) Int. Cl.[7] .......................... G06F 3/00; G11B 27/00
(52) U.S. Cl. ................. 715/753; 715/716; 715/751; 715/758
(58) Field of Search ........................... 345/716, 706, 345/719, 764, 781, 753, 758, 835, 839, 853, 345/854; 715/716, 706, 719, 764, 781, 753, 715/758, 835, 853, 854

(56) References Cited

U.S. PATENT DOCUMENTS

| | | | |
|---|---|---|---|
| 5,767,897 A | | 6/1998 | Howell |
| 5,778,222 A | * | 7/1998 | Herrick et al. ................. 707/9 |
| 5,795,228 A | | 8/1998 | Trumbull et al. |
| 5,801,754 A | | 9/1998 | Ruybal et al. |
| 5,880,731 A | * | 3/1999 | Liles et al. .................. 345/758 |
| 5,923,737 A | * | 7/1999 | Weishut et al. ........... 379/93.17 |
| 5,977,968 A | * | 11/1999 | Le Blanc ..................... 345/706 |
| 5,999,208 A | * | 12/1999 | McNerney et al. ....... 348/14.08 |
| 6,020,885 A | * | 2/2000 | Honda ......................... 345/757 |
| 6,157,945 A | * | 12/2000 | Balma et al. ................ 709/206 |
| 6,212,547 B1 | * | 4/2001 | Ludwig et al. ............. 709/204 |
| 6,227,974 B1 | * | 5/2001 | Eilat et al. ..................... 463/40 |
| 6,249,292 B1 | * | 6/2001 | Christian et al. ........... 345/473 |
| 6,272,231 B1 | * | 8/2001 | Maurer et al. .............. 382/103 |
| 6,476,830 B1 | * | 11/2002 | Farmer et al. .............. 345/769 |
| 6,609,147 B1 | * | 8/2003 | Matsuda et al. ............ 709/205 |

FOREIGN PATENT DOCUMENTS

| | | |
|---|---|---|
| EP | 0753835 A2 | 1/1997 |
| WO | 00/11847 | 3/2000 |

OTHER PUBLICATIONS

International Search Report for PCT/US01/05625.

* cited by examiner

Primary Examiner—Ba Huynh
Assistant Examiner—Nhon D Nguyen
(74) Attorney, Agent, or Firm—Seed IP Law Group PLLC

(57) ABSTRACT

The rich media communication system of the present invention provides a user with a three-dimensional communication space or theater having rich media functions. The user may be represented in the theater as a segmented video image or as an avatar. The user is also able to communicate by presenting images, videos, audio files, or text within the theater. The system may include tools for allowing lowered cost of animation, improved collaboration between users, presentation of episodic content, web casts, newscasts, infotainment, advertising, music clips, video conferencing, customer support, distance learning, advertising, social spaces, and interactive game shows and content.

45 Claims, 16 Drawing Sheets

COMMUNICATION SYSTEM AND METHOD INCLUDING RICH MEDIA TOOLS

BACKGROUND OF THE INVENTION

The present invention relates to multimedia communications, and more particularly, to a rich media communication system based on user combinations of computer graphics, video, still images, audio, and text.

Communication formats have evolved from text to interactive audio-visual communications. Recent virtual reality models generally involve the creation of a shared-space world in which the persons involved in the experience each represent a character in the shared-space world. The user representations, often referred to as avatars, in general consist of video representations or of graphic representations that are animated by a mouse or keyboard. Such virtual reality models often have been limited to real-time interactive communications. Such scenarios and representations limit the creativity and expression available using rich media communication formats.

Accordingly, there exists a need for a system and related tools for providing rich media communications. The present invention satisfies these needs.

SUMMARY OF THE INVENTION

The present invention is directed to a system, and related method, having tools for generating and presenting rich media communications. The tools allow improved and lower cost rich media communications.

The invention may be embodied in a rich media communication system having a theater and a player. The theater includes a representation associated with a person. The representation provides a choice of visual presence for the person. The player presents the theater at a remote location.

An alternative embodiment is a rich media theater controller having a theater window and a presentation control. The theater window has a background presentation scene. The presentation control selects a character for a presentation in the theater. The character presentation may be selected from an avatar, a blue screen cutout of the character, or a plain video presentation.

The theater window may have a media target onto which the person may direct media, such as a video stream or audio, for display or play. The visual representation may be an avatar representation that is driven by visual sensing of the person. A rich media messaging directory service or an online directory may be used for locating other users capable of communicating with rich media presentations. The rich media communication system may include a status window indicating rich media communications received, the user's visibility to other users, the user's availability to other users, and the user's automatic response to rich media communication messages from other users. The rich media communication users may enter into user defined communities organized in hierarchical levels. Also, a theater window may be published to a rich media website.

The rich media communication system may include a message center having a message reader. The message reader may have a text message window and a rich media presentation window. The rich media window may be toggled off such that a user may first read only a text message in the text message window before requesting transmission of a rich media message for presentation in the presentation window.

In another embodiment, the rich media communication system includes a server infrastructure, a content client, and a plurality of communication clients. The server infrastructure provides web hosting, message hosting and communication services. The content client has an authoring tool for generating a rich media communication. The plurality of communicator clients display the rich media communication at remote locations using the server infrastructure.

Other features and advantages of the present invention should be apparent from the following description of the preferred embodiments taken in conjunction with the accompanying drawings, which illustrate, by way of example, the principles of the invention.

DETAILED DESCRIPTION OF THE PREFERRED EMBODIMENTS

The rich media communication system of the present invention provides a user with a three-dimensional (3D)

communication space or theater having rich media functions. The user may be represented in the theater as a segmented video image or as an avatar. The user is also able to communicate by presenting images, videos, audio files, or text within the theater. The system may include tools for allowing lowered cost of animation, improved collaboration between users, presentation of episodic content, web casts, newscasts, infotainment, advertising, music clips, video conferencing, customer support, distance learning, advertising, social spaces, and interactive game shows and content.

The communication system may use existing Internet protocols, communication channels and bandwidth reducing techniques to allow rich media communications over limited bandwidth channels. For example, a theater may be created which has an individualized space with media targets and an image or representation of the user. The theater space is transmitted to a receiver only once. The user representation may be represented by an avatar animated using low-bandwidth control signals, or alternatively, by a bandwidth reducing video cutout.

The rich media communication system of the invention allows each person to create his own world in which he is presented to others. The person's individual creativity may provide enhanced entertainment and attention retaining value to the communications space.

Figure 1:
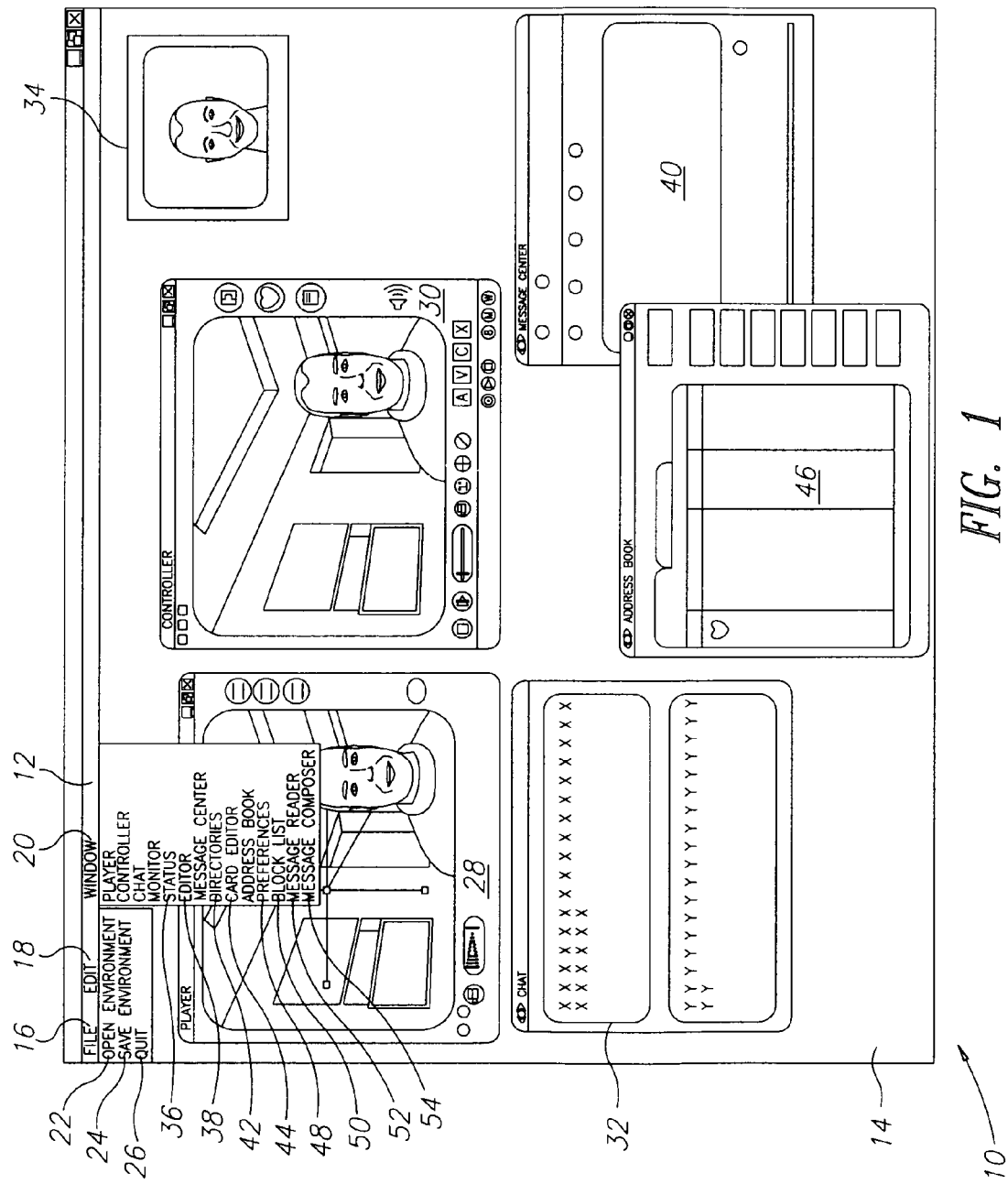
FIG. 1 is an image of an application window for a communication system having rich media tools in accordance with the present invention.

The rich media communication system of the present invention may be embodied in an application window for a communicator shown in FIG. 1. The communicator window 10 is composed of a menu bar 12 and a non-interactive background 14. A variety of communication tools may be invoked in the application window, which tools arise as child windows on the background. The communicator's application window has three global menu options: file 16, edit 18, and window 20. In addition to the global menu, a global toolbar may be used for the application window options.

Under the file menu 16, a previously saved session file or environment may be opened 22, the current session may be saved 24, or the program quit 26. Under the edit menu 18 are context sensitive cut, copy, and paste. Also, an option exists for editing user preferences. Under the window menu 20 are options to open the variety of child window tools. As discussed in more detail below, the tools may include a player 28, a controller 30, a chat module 32, a monitor 34, a status window 36, an editor 38, a message center 40, directories 42, a card editor 44, an address book 46, preferences 48, a block list 50, a message reader 52, and a message composer 54. Through the window menu option, a communication tool may be invoked and an associated window pops up on the background. As shown in FIG. 1, the player 28, the controller 30, the monitor 34, the message center 40, the address book 46, and the chat module 32 have been invoked. The individual tool windows may be positioned as desired by the user and may be placed in an overlapping format as is common to typical window applications.

Figure 2:
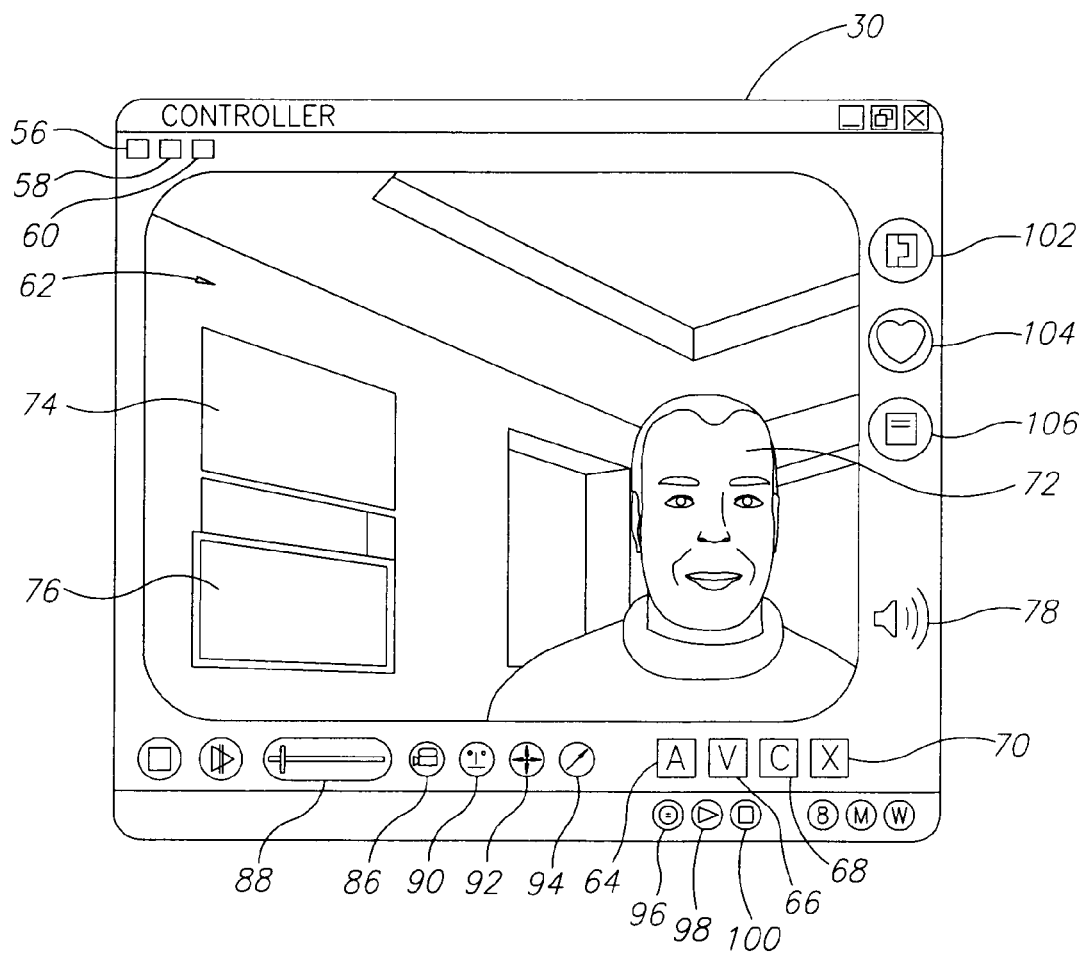
FIG. 2 is a image of a presentation control window for display in the application window of FIG. 1, having a variety of rich media targets and communication channels for generating a personalized rich media communication.

The controller window 30 is shown in FIG. 2. The controller allows a user to control the content that is presented to other users as sessions or messages. The controller window may also show the user what other users may currently view. The controller window may be formatted with three buttons, 56, 58 and 60, that open file manager windows. The three file manager windows are the theater file, the avatar file, and the media file manager windows.

In the center of the controller 30 is a display region 62 that provides a working area for constructing a rich media communication session. The controller may provide a visual representation of a user using four buttons, 64, 66, 68 and 70, that gives the user media control of the user's appearance. The buttons are radio buttons that immediately switch between available visual modes. The modes include an avatar mode, a video mode, a cutout mode, or a show nothing mode. If a mode is not available in particular theater, the associated button is grayed out.

Figure 4:
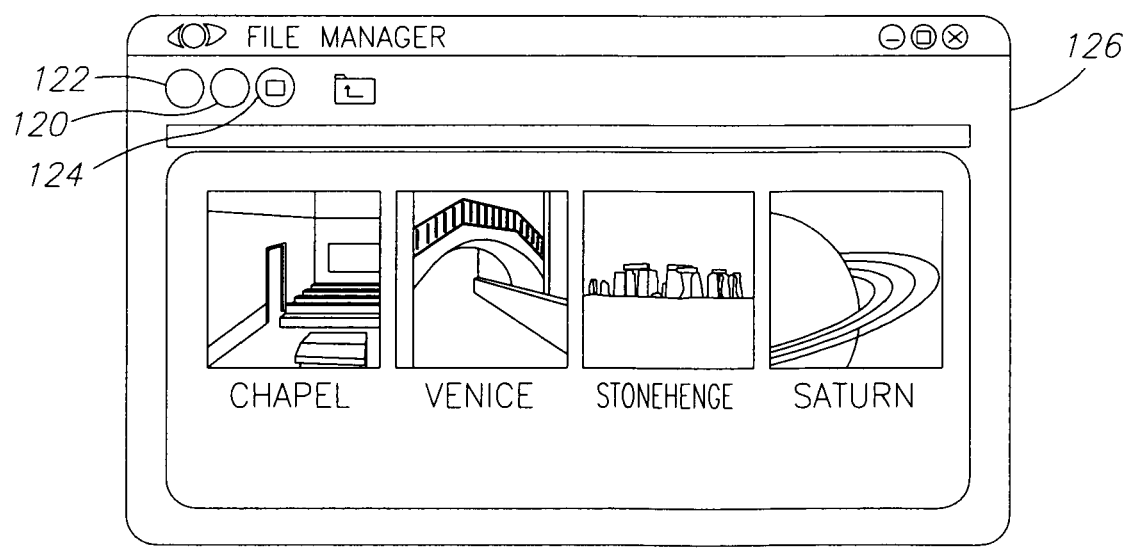
FIG. 4 is an image of a file manager window of theaters for use in the rich media communication system of FIG. 1.

The controller window 30 may be organized as a theater that provides a stage on which a representation 72 of the user may be displayed and provides media targets, 74 and 76, on which selected media from a file manager (FIGS. 4–6) may be placed by the user. The theater may be selected or changed by selecting a theater from the theater file menu and dropping the theater into the controller presentation window. An avatar may be selected from the avatar file manager and dropped it onto the stage of the theater. In the theater, shown in FIG. 2, the avatar mode has been selected. A user may select a media file from the media file manager and drag and place it onto a media target. The media may be a video, a still image, or audio file. When media is placed on a media target, it is either displayed or played in the media target. Media may be presented in the targets by selecting media from the media file manager and dropping it onto a particular media target or by dropping the media onto the theater. When a media file has dropped on the theater, the theater places the media into the first available mediate target as designated by the theater designer. If an audio file is dropped onto the stage, the audio is directed to a speaker icon 78 and the audio file played. If the audio file is dropped onto non-audio target, the audio file is nevertheless played. The media targets may be either 2-D or 3-D panes as specified by a particulars stage of the theater. A special media target is the speaker icon next to the presentation the window. This media target receives and plays audio information only. The user may right click the mouse over a media target to invoke a pop-up menu having the following options: open file for opening a media file for display in that particular target, or properties for display of the media. For example, the display properties may include a stretch, crop, playback rate, or show all frames.

The controller 30 also includes control buttons for controlling the media in the targets. The particular media target is selected by clicking on the target and its properties may be controlled using the control buttons. If no immediate target is currently selected, the media controls are grayed out.

The controller 30 includes a camera button 86 which, when toggled, brings up a camera control user interface overlaid on top of the window. The controller may also include a loudspeaker button 88 that controls the volume of the audio coming from the user's microphone. The controller also includes a behavior button 90 which, when invoked, pops up a pop-up menu of all the available behaviors for a currently displayed avatar. The user may then select one of the behaviors for the avatar. The pop-up menu also shows any hot keys associated with particular behaviors. The controller also includes mutually exclusive radio buttons, 92 and 94, for move/select. When the select button is selected, a mouse click on an object causes the media controls to be directed to that target. When the move button is selected, a mouse click on an object brings up a move interface on top of the object. Also, object translation and rotation may be performed using mouse clicks and or drags.

The controller 30 includes a recorder for savings of a user's session. The recorder includes buttons, 96, 98 and 100, for saving the recorded session as a file, making a message out of the recorded session, or making a web page out of the recorded session. The controller also includes a directory button 102, an address book button 104, and a friend's button 106.

The monitor window 34 (FIG. 1) is generally used in conjunction with the controller. The monitor window is used to monitor the quality of data when the video cut out modes are selected, and the performance of the visual sensing software when the avatar mode is selected. The monitor window includes three radio buttons for choosing between display of the live video coming from the user's camera, the live video associated with a blue screen cut out of the user, or the live video with sensing control points overlaid on it showing the performance of a tracker for animating the avatar. The monitor window also includes a volume slider for controlling the user's volume.

Figure 3:
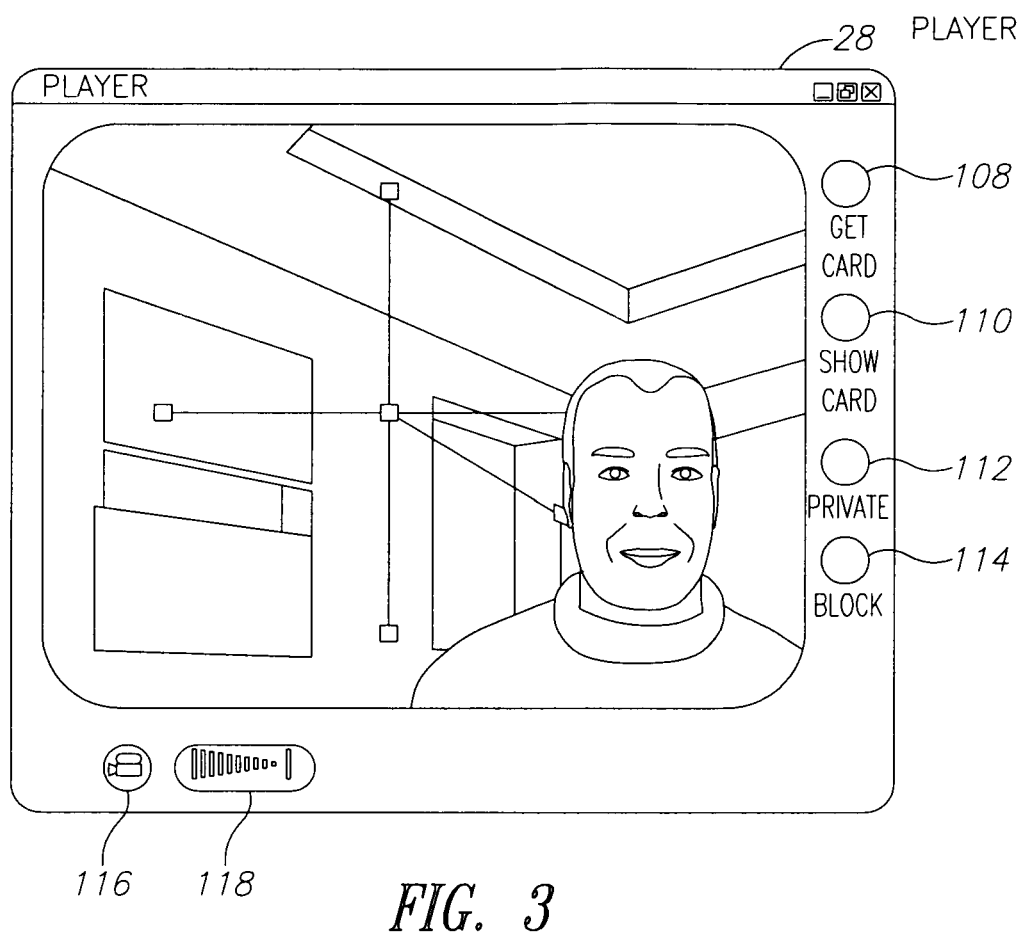
FIG. 3 is an image of a player window for presenting a personalized rich media communication.

The player window 28 is shown in FIG. 3. Rich media presentations are delivered to a user's player for display. The player includes buttons, 108, 110, 112, 114 and 116, for getting or showing a user's card, for privacy or blocking, for camera control, and a slider 118 for volume control.

Figure 5:
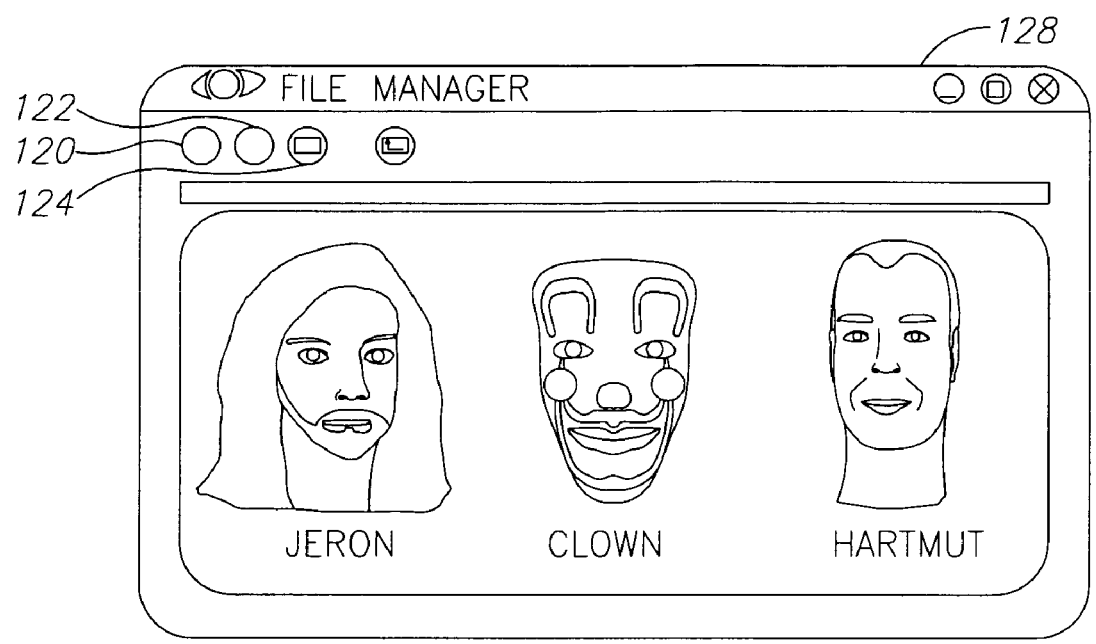
FIG. 5 is an image of a file manager window of avatars for use in the rich media communication system of FIG. 1.
Figure 6:
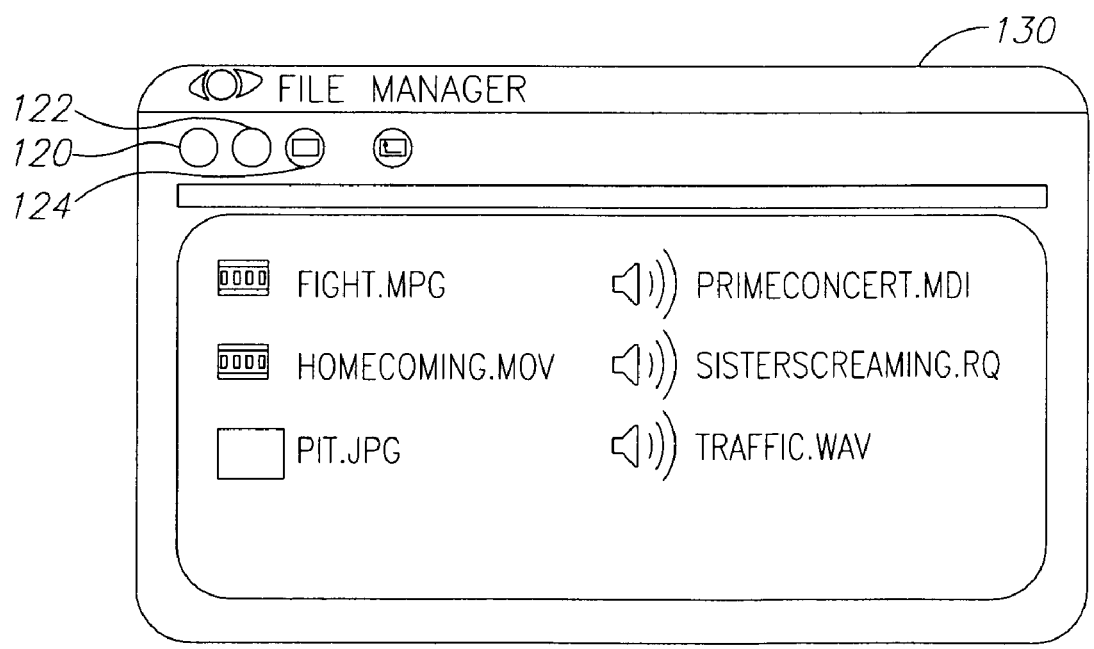
FIG. 6 is an image of a file manager window of rich media files for use in the rich media communication system of FIG. 1.

The file manager includes three buttons, 120, 122 and 124, for toggling the file manager between the theater file manager 126, the avatar file manager 128, and the media file manager 130. The theater file manager 126, shown in FIG. 4, displays a thumbnail associated with each theater. A theater may have more than one configuration, and these configurations are collected into one object. The avatar file manager 128 is shown in FIG. 5 and the media file manager 130 is shown in FIG. 6. In the media file manager 130, the user is shown an icon for every file in the current file directory which may be dropped onto media target. The icons or symbols indicate whether the file is a video, still image, or audio file. Media files may be dragged and dropped onto media targets in the controller window. The file manager also includes cut, copy, paste and delete option under an edit menu available in the media file manager.

Figure 7:
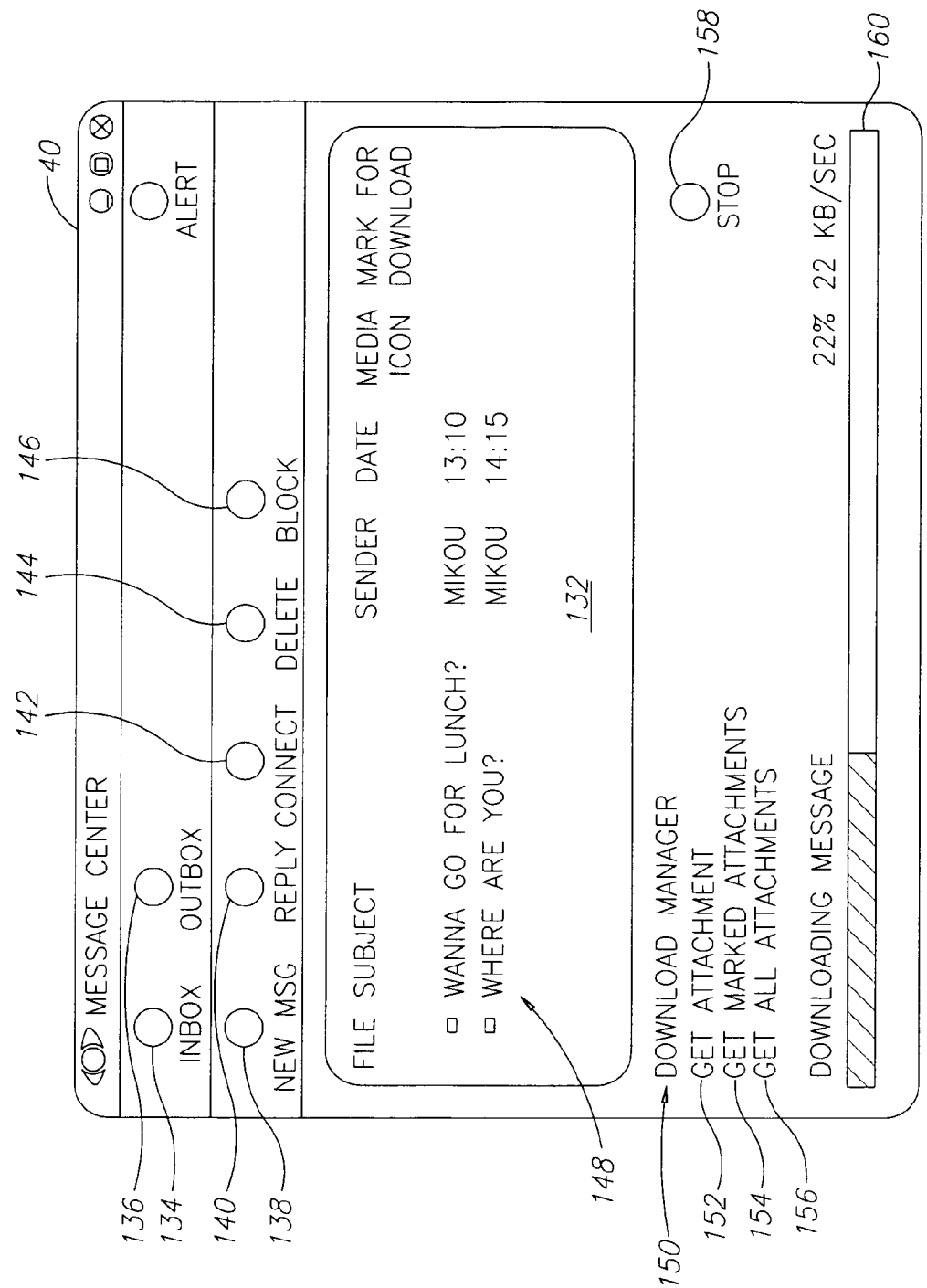
FIG. 7 is an image of a message center window of an inbox for use in the rich media communication system of FIG. 1.

The message center window 40 is for handling rich media communication messages. The messages may be either just text, text with attached rich media, or only rich media. The inbox 132 of the message center is shown in FIG. 7. The inbox and outbox may be selected using two radio buttons, 134 and 136, near the top of the message center. When the inbox button is selected, the message center window will show what is in the user's in box, and when the out box radio button is selected, the message window shows what is in the user's outbox. A new message button 138 opens a message composer window allowing the user to create a new message. A reply button 140 opens the message composer window with the sender of the currently selected message in the "to" field. A connect button 142 allows the user to attempt to open a live connection with the sender of a currently selected message. If the live connection is successful, the sender will appear in a new player window 28. A delete button 144 permanently deletes the currently selected message. A block button 146 adds the sender of a currently selected message to a block list. The currently selected message is immediately deleted and future messages from the sender are also deleted. After a sender placed on the block list, the sender will not exist again in the inbox of the user.

The message list 148 is a columnar table of all the messages that the user has received. Using a mouse to click on any of the column headings sorts the message list by that heading. Double clicking the mouse on the subject of the message opens that message in a new message reader window. If a rich media attachment is included in the message, an icon will be displayed in a media icon column.

Rich media sessions which have been included as an attachment and which have been downloaded will appear as an icon in a file column. Rich media sessions which have not been downloaded may be marked for downloading in a download column. A triangle icon 150 associated with the words "download manager" is provided in the message center window 40. When the download manager triangle icon is selected, associated buttons are provided for allowing the user to control downloading of rich media to a local hard disk. A "get attachment" button 152 allows the user to download rich media associated with the currently selected message. A "get marked attachment" 154 button allows a user to download rich media in marked messages. A "get all attachments" button 156 allows the user to download any rich media which has not been downloaded. A stop button 158 allows user to halt the download process. A downloading message indicator 160 may show how much more of a rich media component is left for downloading both as a visual indicator and as a percentage. The current download speed also may be indicated.

Figure 8:
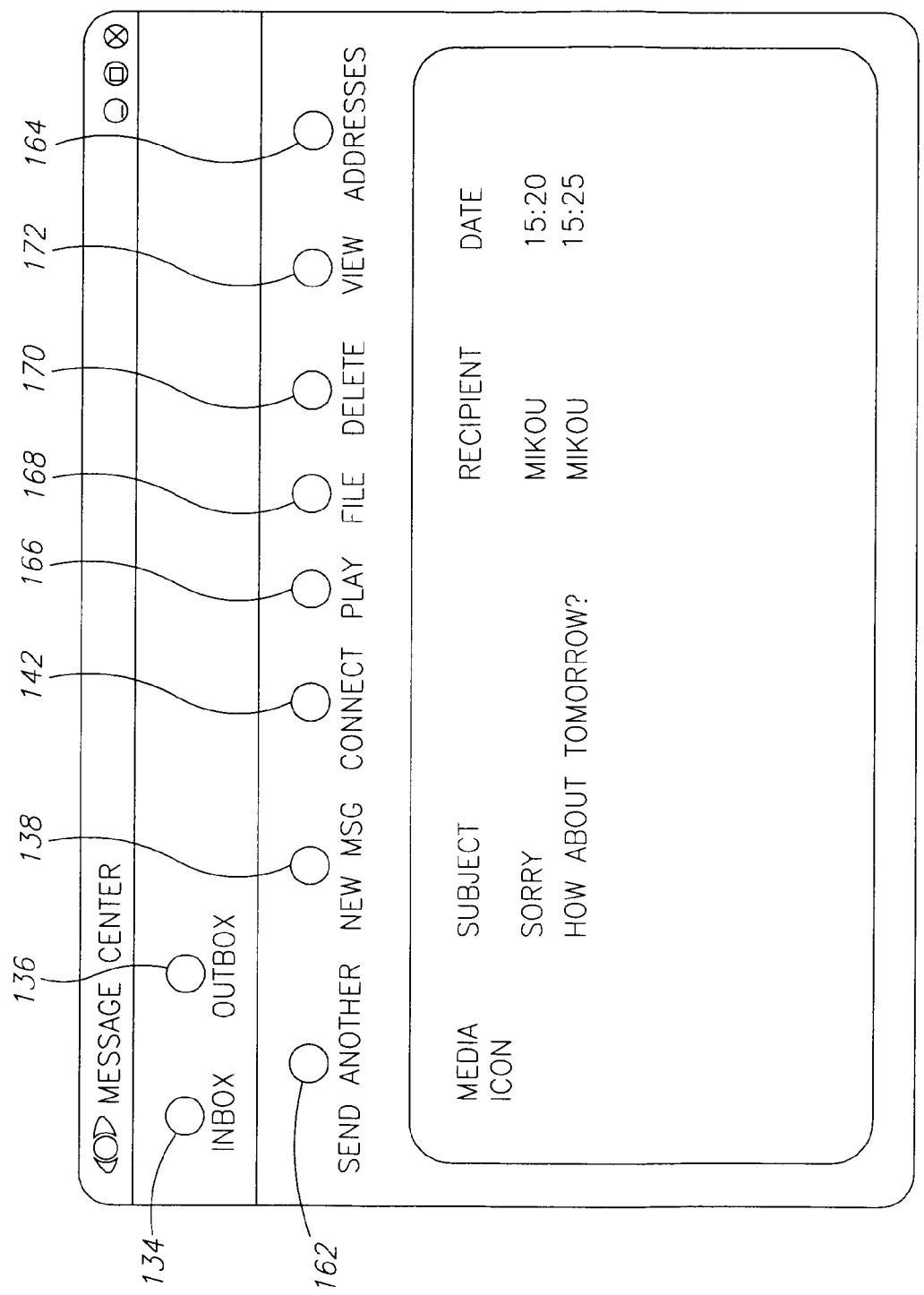
FIG. 8 is an image of a message center window of an outbox for use in the rich media communication system of FIG. 1.

By selecting an outbox button 136 of the message center, as shown in FIG. 8, the user is provided with a list of the messages that the user has sent to other users. A send another button 162 allows the user to send a message to additional users. This button brings up a message composer with everything filled in with the selected message except the "to" field. An address button 164 allows the user to open an address book of received user cards. Buttons 166, 168, 170 and 172, are provided to play, file, delete and view messages. The other buttons of the message center performed as described above with respect to the inbox.

Figure 9:
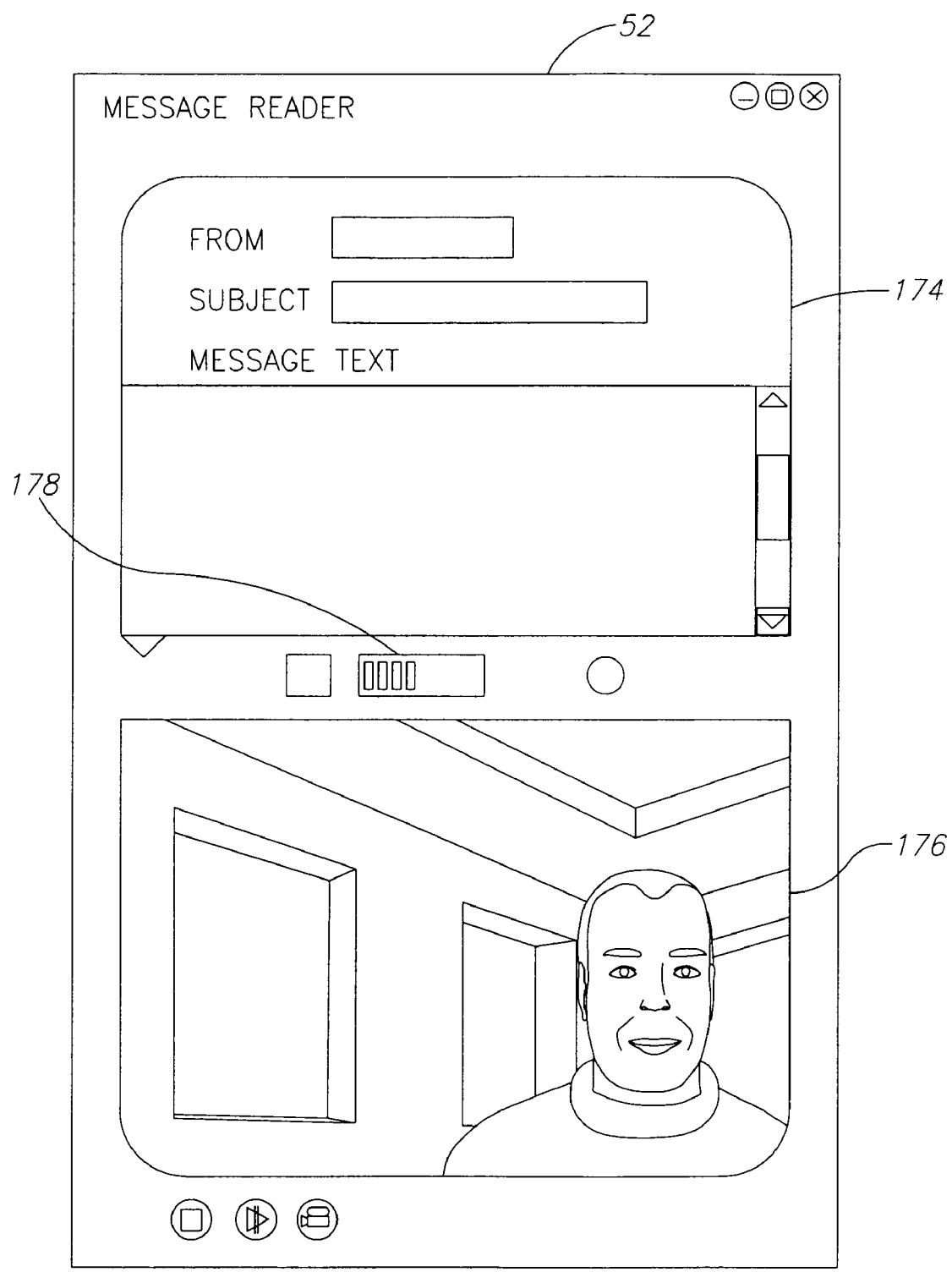
FIG. 9 is an image of a message reader window for presenting a personalized rich media communication provided as a message.

The message reader window 52, shown in FIG. 9, is a two-part window that allows a user to play messages. When the reader is selected or a message is selected for playing, the first top portion 174 of the reader indicates whom the message is from, the subject of the message, and associated message text. The size of the rich media component for downloading is also shown in the message window. The user may toggle the second half 176 of the reader window, which allows the user to display the rich media portion of the message. When the rich media portion 176 is selected, the media player opens in the bottom portion of the window and the rich media starts streaming and playing in the media player window. A download indicator 178 shows the progress of the rich media download.

Figure 10:
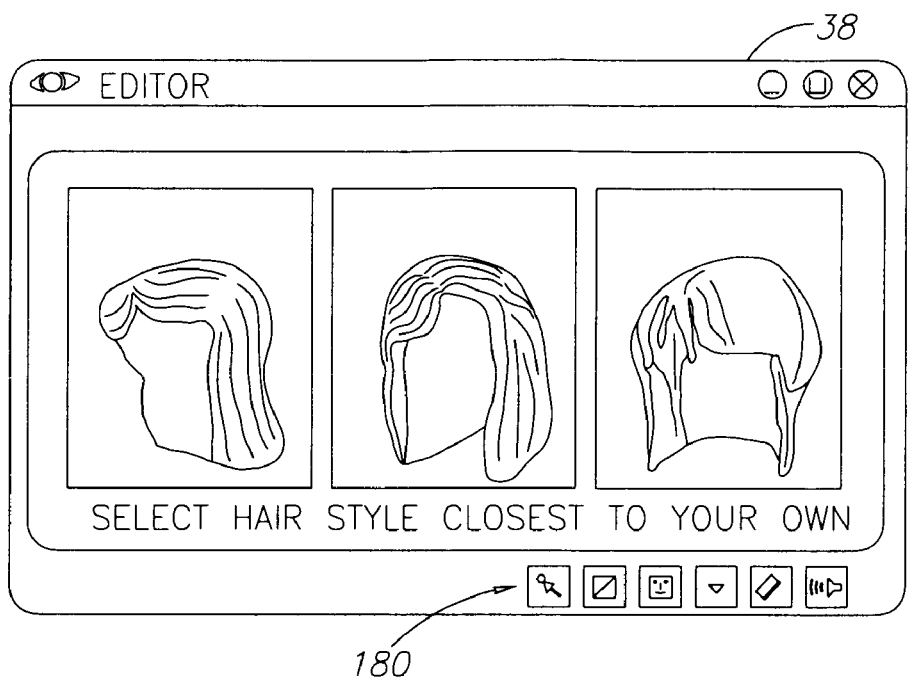
FIG. 10 is an image of an editor window for generating avatar images for use in the rich media communication system of the invention.

An editor window 38, shown in FIG. 10, allows a user to create custom avatars, new theater stages, and to edit other media. The editor window includes five sub or child windows. Each child window is selected using an appropriate radio button 180 at the bottom of the editor window. Each child window has its own user interface that allows the user to add the associated media, avatar, or theater. The theater editor allows the user to create a custom theater. The user may change the texture mapped on parts of the theater, may bring in new objects. Alternatively, the media editor allows the user to launch helper applications that provide editing of video, audio, video with audio, and still pictures.

An avatar editor window allows a user to generate an avatar that looks and appears similar to the user. A wizard allows the user to select a head geometry that is similar to the head geometry of the user. A new avatar is generated based on an image of the user. Alternatively an existing avatar may be edited to the satisfaction of the user. The avatar may be animated or driven by wavelet-based facial motion capture as described in U.S. patent application Ser. No. 09/188,079 (WO 99/53443 A1), which is incorporated herein by reference.

The avatar window includes a wizard that leads the user through a sequence of steps for allowing the user to improve the accuracy of tracking of the avatar tracker. The avatar wizard may include a tutor face that prompts the user to make a number of expressions and varying head poses. A position is taken for each image and facial features are automatically located for each face image. The user has the opportunity to manually correct the positions of the automatically located features.

Figure 11:
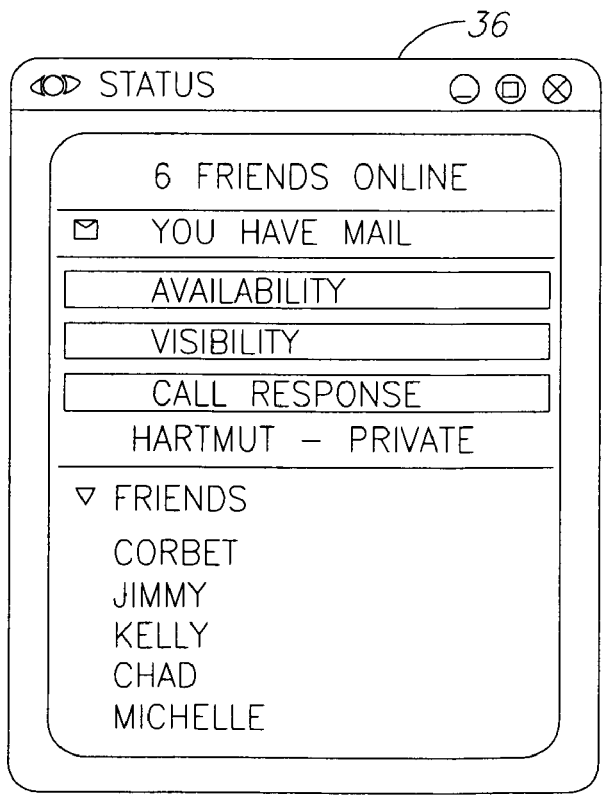
FIG. 11 is an image of a status window for use the in the rich media communication system of FIG. 1.

The status window 36, shown in FIG. 11, displays concise information regarding the user and the user's friends who are currently online. The status window shows whether the user has received new rich media messages and allows the user to select his online visibility. For example, the user may select to be visible on white and yellow pages, to current cardholders, friends, or the user may select invisibility. In addition the user may select to whom he is available. The availability may range from available to everyone, available for cardholders, available for friends, or unavailable. The user may also select how his automated call response will react to incoming calls. For example, the call response may be auto accept, caller ID, busy, or a message that the user will call right back. The field also shows a user's identity or ID. The concise nature of the status window information allows the status window to reside permanently on a users desktop.

Figure 12:
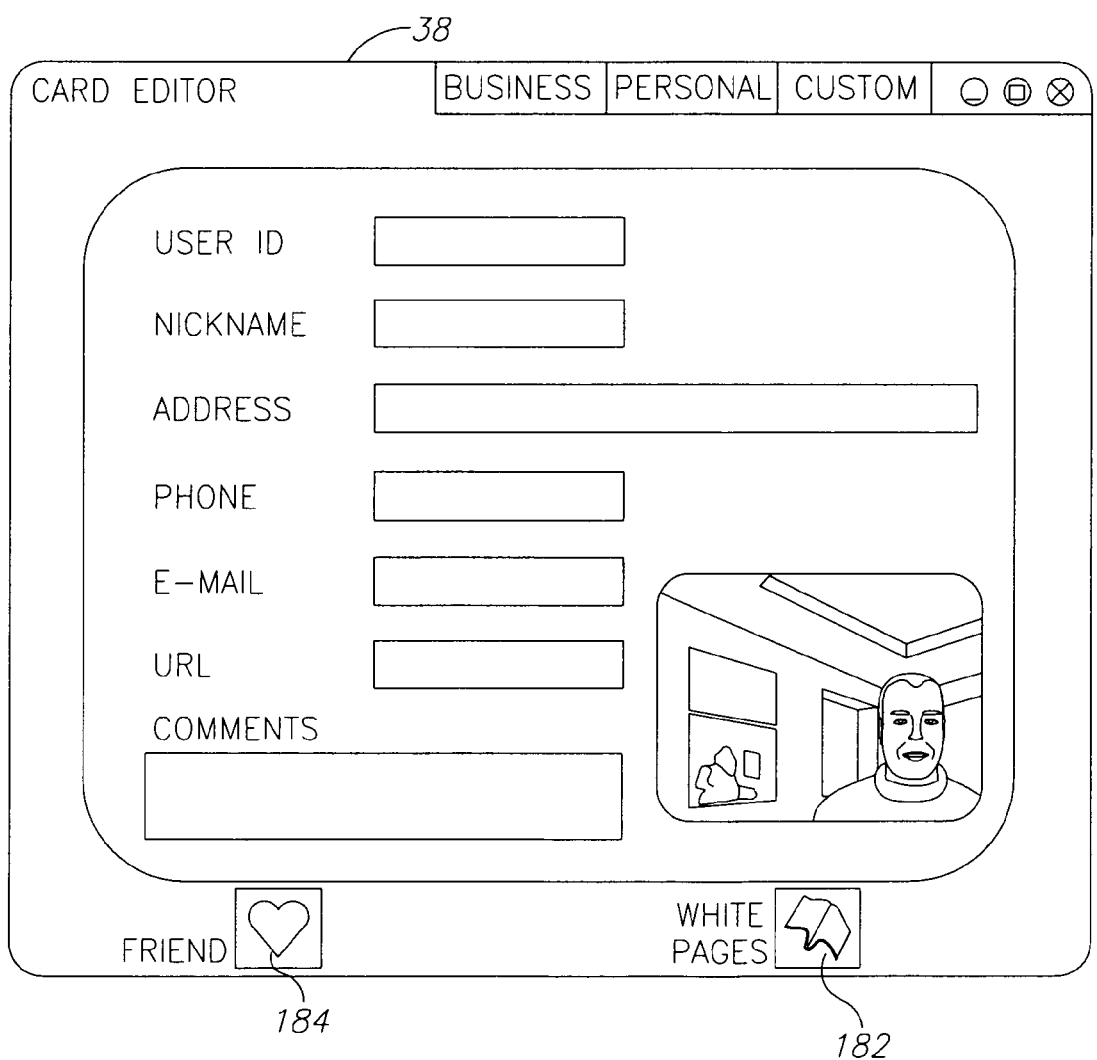
FIG. 12 is an image of a card editor window for use in the rich media communication system of FIG. 1.

A user card editor window 38 is shown in FIG. 12. User cards are a convenient means for allowing the users to exchange their coordinates and parameters. A user may appear under several different user IDs. For each ID, the user may provide the card to friends and other users. The user's ID generally includes the user's nickname, address, phone, email, a web page URL, and any comments that the user may provide. The card editor may also show thumbnail of the user in a rich media environment. A white pages button 182 allows the user to be listed in the white pages. A friends button 184 allows predetermined friends of the user to view whether the user is online.

Figure 13:
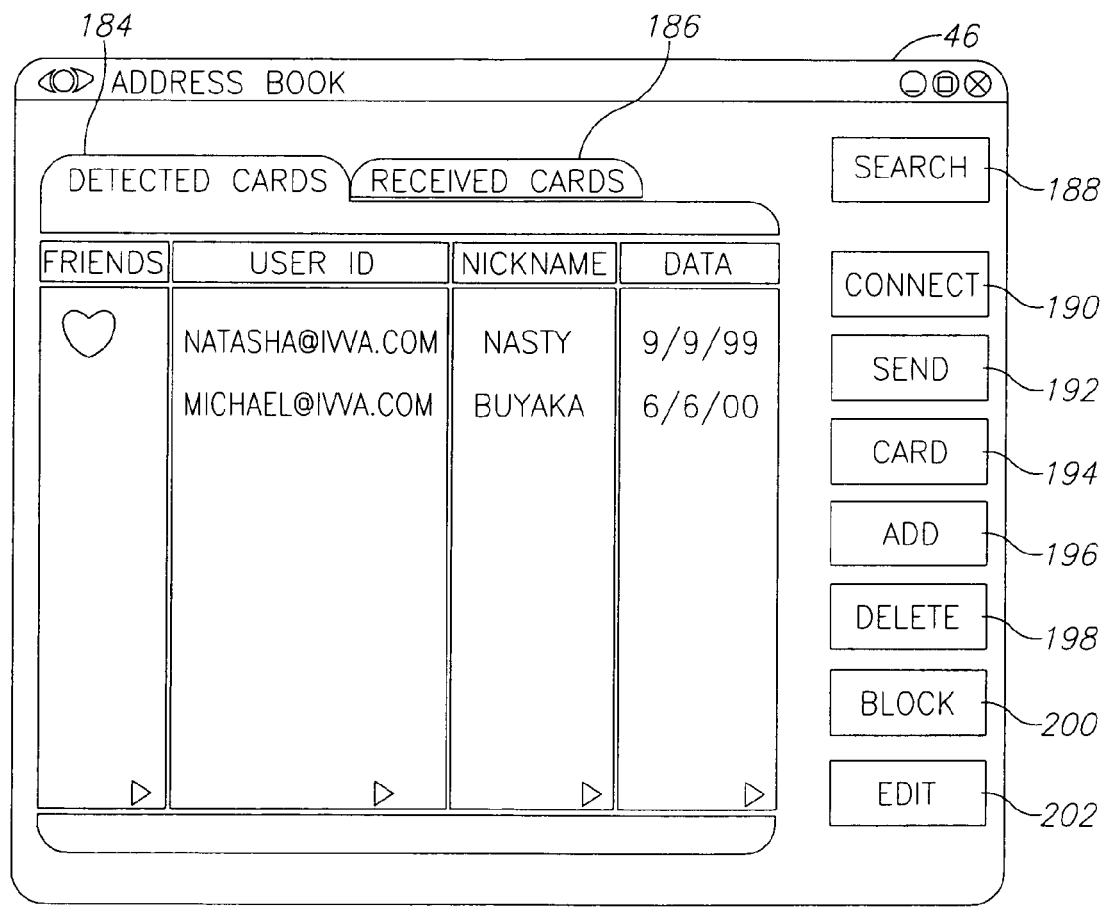
FIG. 13 is an image of an address book window for use in the rich media communication system of FIG. 1.

An address book or card manager 46 is shown in FIG. 13. The address book includes tabbed fields, 184 and 186, indicating to whom the user has distributed cards and from whom the user has received cards. Several columns indicate whether the cards are associated with friends, along with the card's user ID, nickname, and the date the card was received or sent. The address book has buttons for searching for nicknames or users 188, connecting with a particular user 190, sending messages to users 192, sending cards to users 194, adding users to the address book 196, deleting users from an address book 198, blocking users 200, and editing the user's properties 202.

Figure 14:
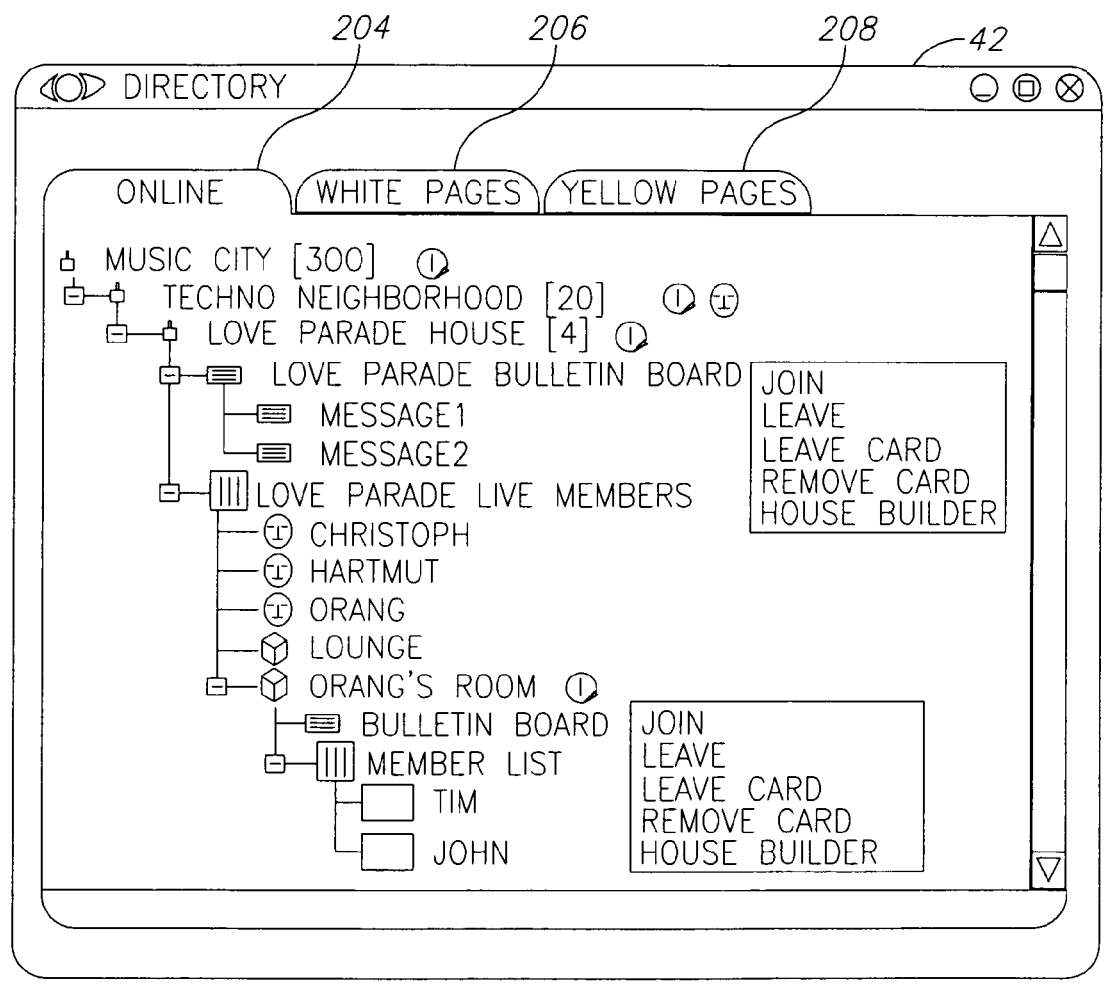
FIG. 14 is an image of a directory window for use in the rich media communication system of FIG. 1.
Figure 15:
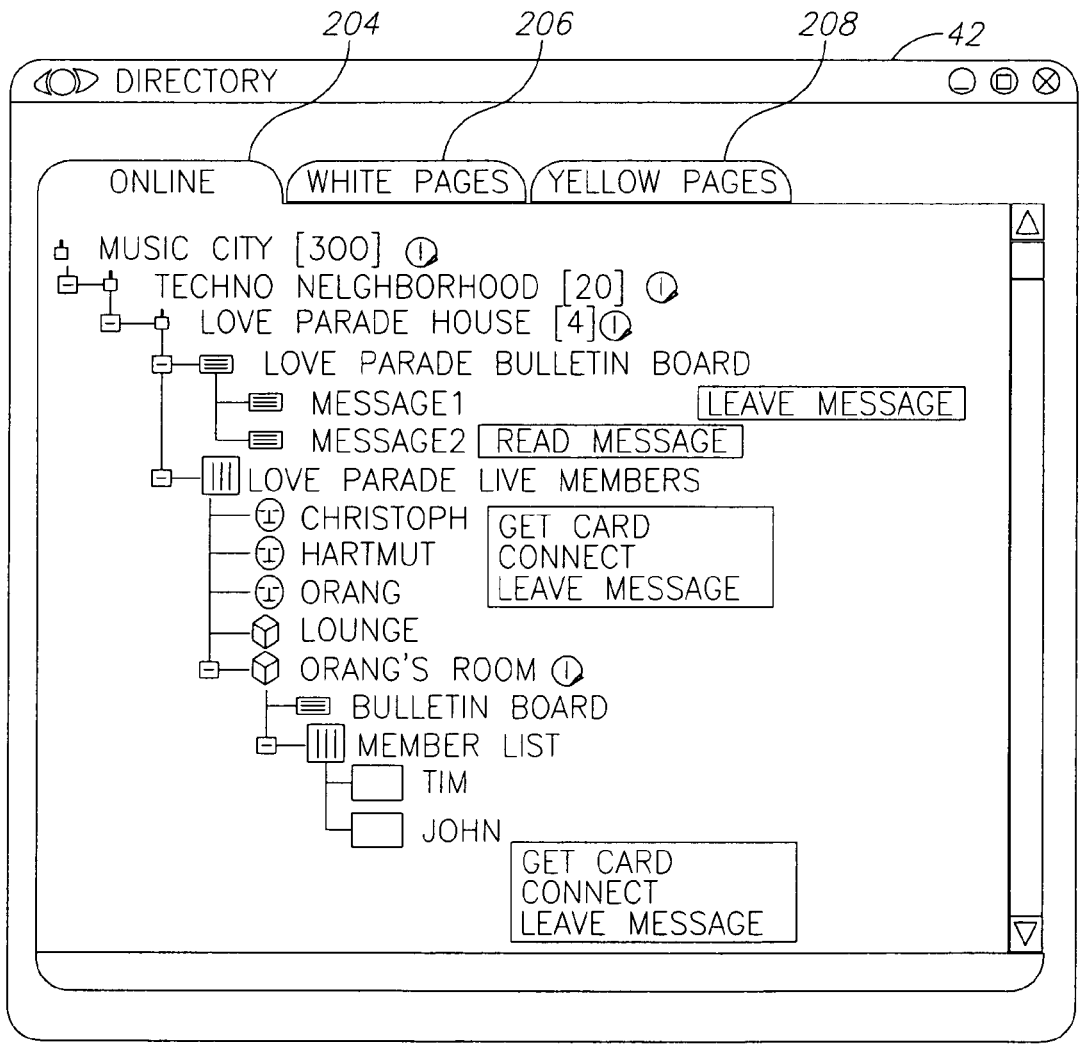
FIG. 15 is an image of a directory window for use in the rich media communication system of FIG. 1.

A directory 42 associated with the rich media communication system is shown in FIGS. 14 and 15. The directory includes an online directory 204 associated with a hierarchal organization, a white page directory 206, and a yellow page directory 208. The online directory 204 allows the user to roam between the hierarchal levels. The user may be in only one location at a time. Users at their location are listed by their user ID or nickname. User may leave a card in order for other users to leave a message for him after the user has left an area. A button in the directory allows the user to toggle between all members at a location and live members at a location. A user may directly contact a live member in the directory.

The hierarchal levels of the directory may be cities, neighborhoods, houses, and rooms. Cities and neighborhoods may be put in place by server staff. Houses and rooms may be built by users. Each hierarchal level has an information button. When activated, a rich media message plays describing the location. To build a house, a user clicks on a house builder button next to a neighborhood, and to build a room, a user clicks on a builder button next to a house. Rooms in houses may have bulletin boards upon which users may leave or read messages. Entering a room is similar to entering a conventional chat room. Each live member of the room or house appears as a thumbnail with his theater next to his name.

Figure 16:
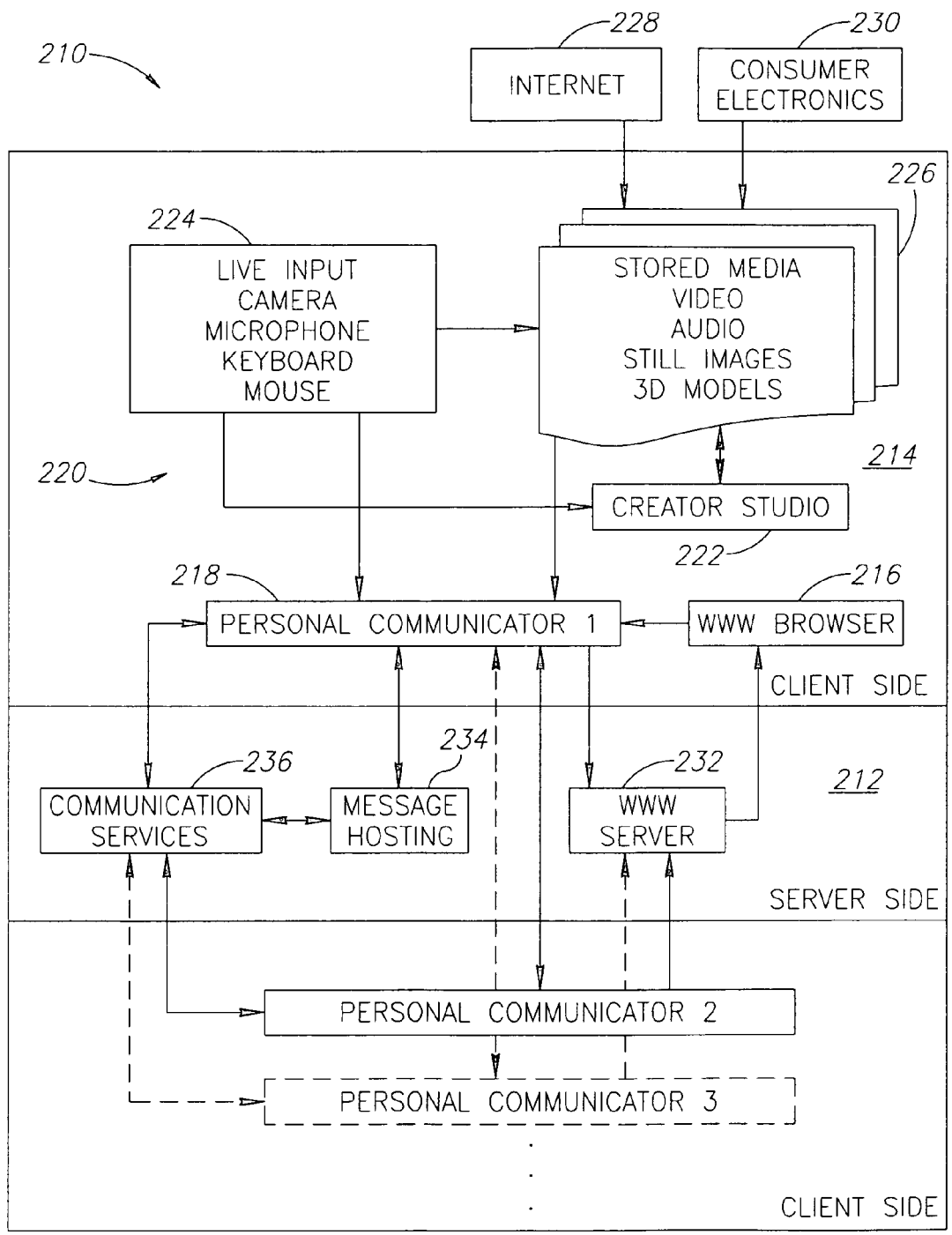
FIG. 16 is a block diagram of the architecture of the rich media communication system of FIG. 1.

A block diagram of an embodiment of a rich media communication system 210 of the invention is shown in FIG. 16. The system includes a rich media server 212 and a number of rich media clients 214. A user creating a rich media communication has a client that includes to a web browser 216, a personal communicator 218, and an authoring tool 220. The authoring tool includes a creator studio 222 that receives live input 224 and stored media 226. The live input may be from a camera, microphone, keyboard or mouse. The stored media may be in the form of video, audio, still images, or 3-D models. In addition, additional media may be obtained from a connection to the Internet 228 or from other consumer electronic devices 230.

The server includes a web server 232, message hosting 234, and communication services 236. The server also includes resource information and parameters for each user allowing other users to engage in direct communication with a user based on the parameters stored on the server.

Figure 17:
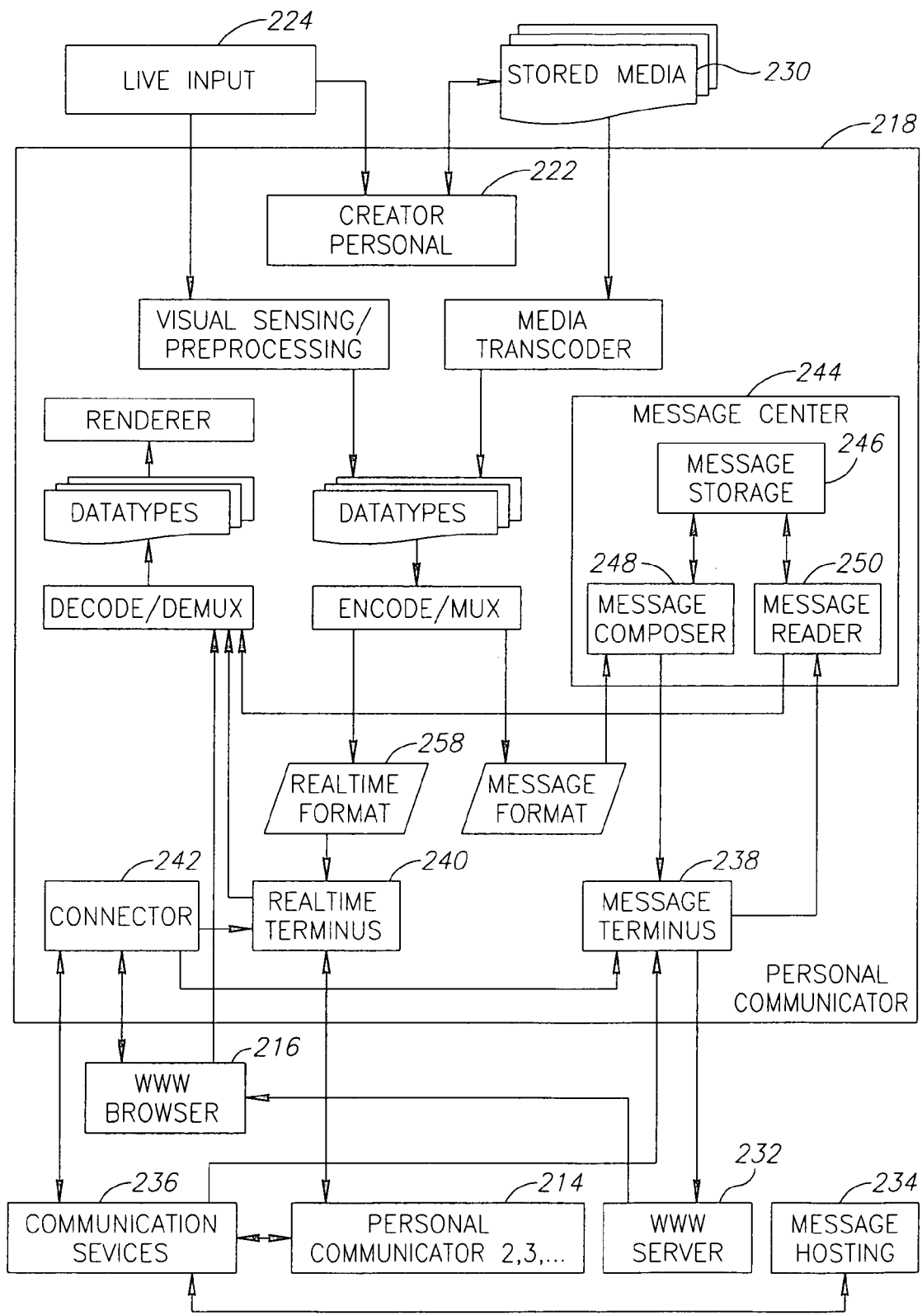
FIG. 17 is a block diagram of the architecture of a personal communicator of the system of FIG. 16.

Clients of other users may include a personal communicator 218 having only a player window or may include the authoring tools described above. A client side personal communicator 218 is shown in more detail in FIG. 17. The communicator has links to the server 212 through message terminus 238, real time terminus 240, and a connector 242. Media is input from the live input 224 or from the stored media 230 into the authoring tool or personal creator 222. The media is encoded into a stream as a real time format or as a message format. In the real time format, the stream is directed to the communicators of other users. In the message format, the stream is directed to a message center 244 that stores the message 246 and provides a message composer 248 and message reader 250.

Figure 18A:
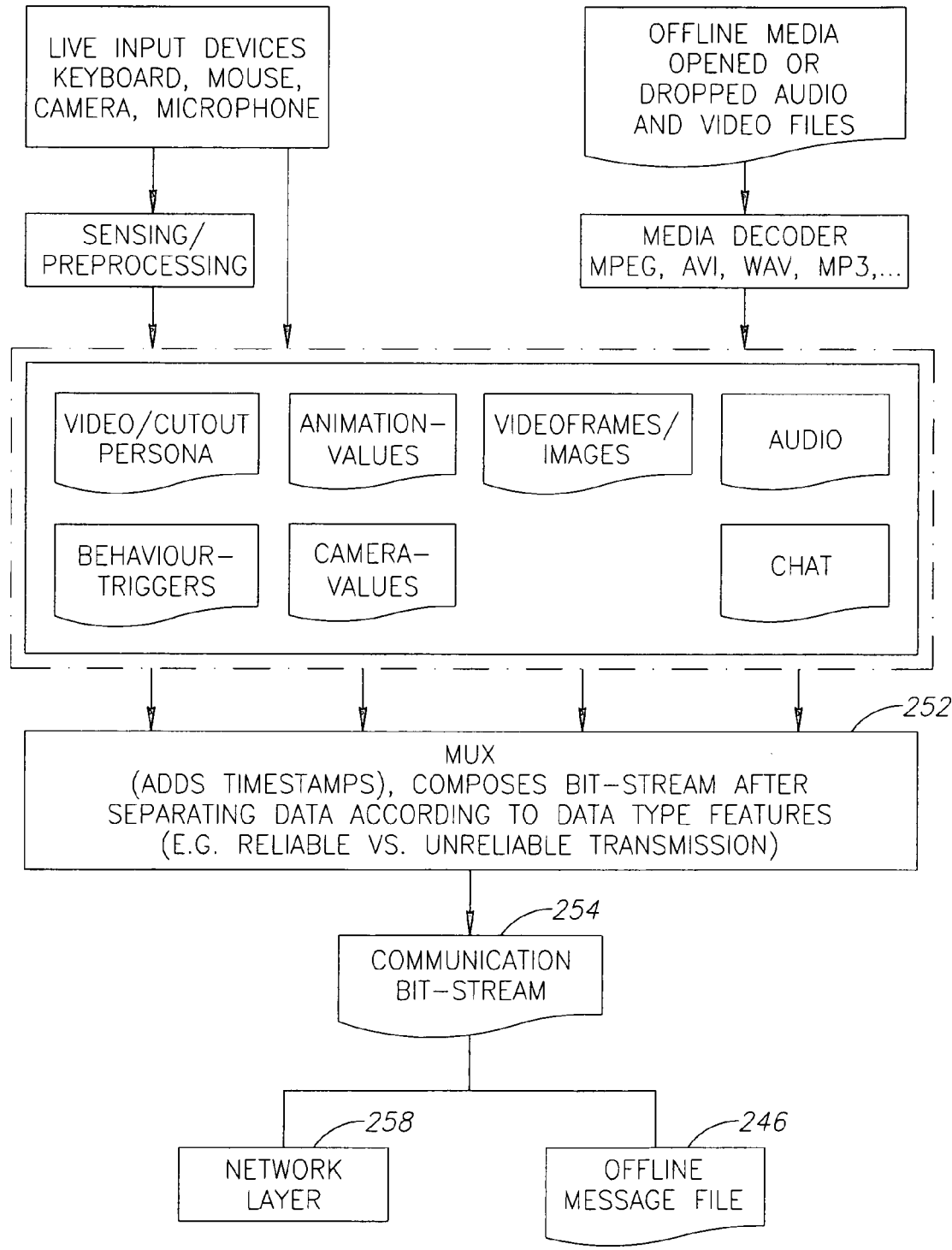
FIGS. 18A and 18B show a block flow diagram of rich media communication across a communication channel in accordance with the invention.
Figure 18B:
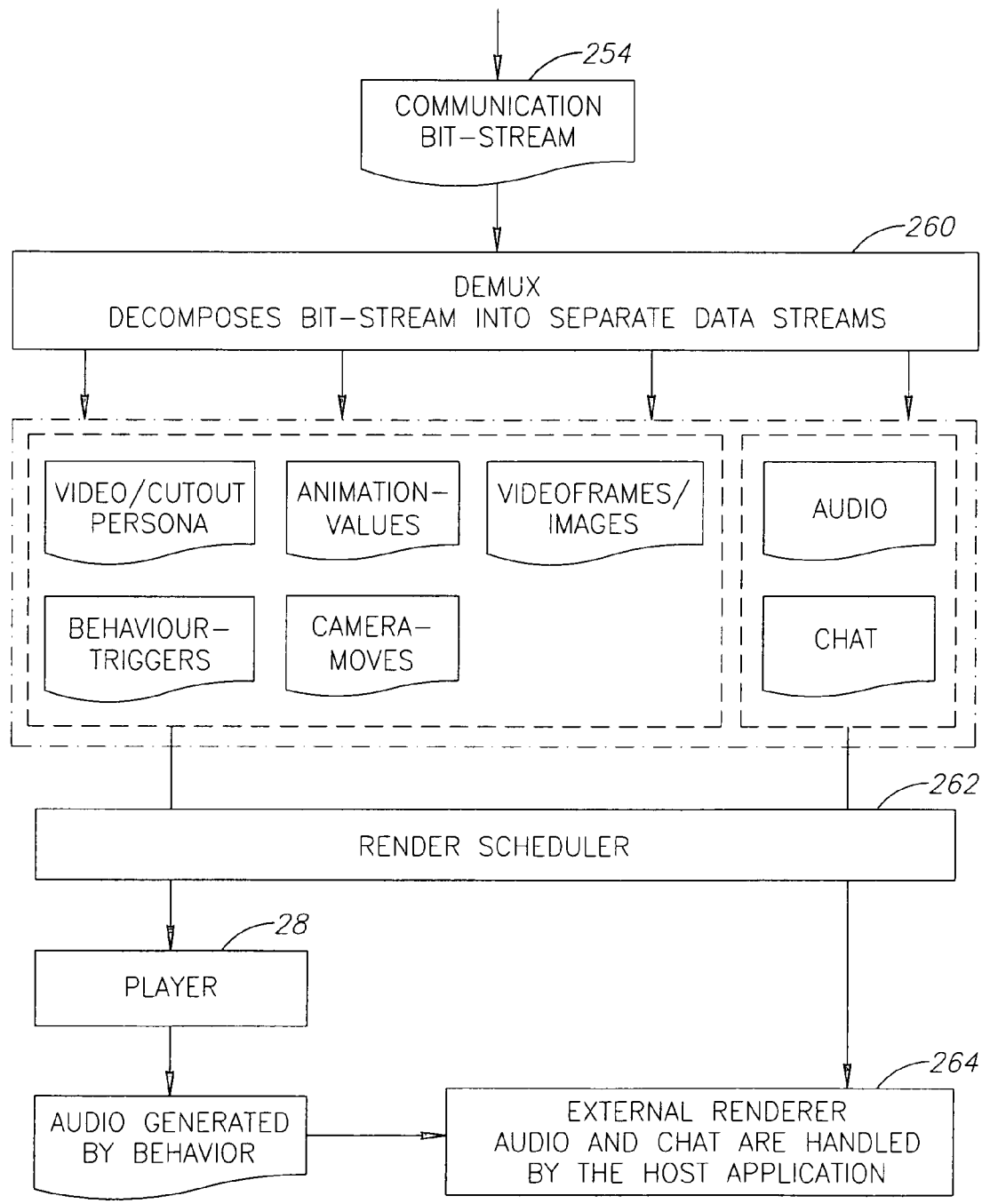

A flow diagram of the rich media communications data or bit stream is shown in FIGS. 18A and 18B. Media is input into a multiplexer 252 which adds timestamp data and composes as a bit stream 254 after separating the data according to the data type features. The data includes information on the user's representation (video cutout or avatar animation values) and the user's audio and chat text messages. The multiplexer 256 composes the bit stream and provides the bit stream to either a network transmit layer 258 or an off-line message file 246. The transmitted bit stream is received by other users and a demultiplexer 260 decomposes the received bit stream into separate data streams. The data streams are separated into individual media elements which are provided to render scheduler 262. The render scheduler provides the media elements to a player 28 or external renderer 264.

Although the foregoing discloses the preferred embodiments of the present invention, it is understood that those skilled in the art may make various changes to the preferred embodiments without departing form the scope of the invention. The invention is defined only by the following claims.

We claim:

1. A rich media communication system, comprising:
   a theater including a representation, associated with a particular person, to provide a choice of visual presence of the particular person, including at least a personalized three-dimensional avatar representation of the particular person based on sensed geometric features of the particular person;

a presentation control to allow capability to switch between different choices of visual presence of the particular person during a session in the theater;

a player to present the theater at a remote location, wherein the particular person is at least one user of the rich media communication system, the rich media communication system further including:

a directory to organize rich media communications users into user-defined communities, each user being associated with their own respective independent theater having rich media content, the communities being organizable in hierarchical levels, at least one hierarchical level being associated with a moderator for that level, the hierarchical levels including at least one city, the city including at least one neighborhood, the neighborhood including at least one house, and the house having at least one room.

2. A rich media theater controller, comprising:

a theater window having a background presentation scene;

a presentation control to allow a rich media communication user of the theater window to select a particular character for a presentation in the theater window, wherein the presentation of the particular character may be selected from a three-dimensional avatar, a blue screen cutout of the character, an audio presentation, or a video presentation, the presentation control further including capability to switch between different presentations of that particular character during a session in the theater window, the rich media theater controller further including:

a directory to organize rich media communications users into user-defined communities, each user being associated with their own respective independent theater window having rich media content, the communities being organizable in hierarchical levels, at least one hierarchical level being associated with a user who acts as a moderator for that level, the hierarchical levels including at least one city, the city including at least one neighborhood, the neighborhood including at least one house, and the house having at least one room.

3. A rich media communication system, comprising:

a theater window having a representation associated with a particular person, the theater having a media target onto which the person may direct media, the representation including at least a selectable personalized three-dimensional avatar representation of the particular person based on sensed geometric features of the particular person;

a presentation control to allow capability to switch between different representations of the particular person during a session in the theater window; and a player to present the theater window to a remote location, wherein the particular person is at least one user of the rich media communication system, the rich media communication system further including:

a directory to organize rich media communications users into user-defined communities, each user being associated with their own respective independent theater window having rich media content, the communities being organizable in hierarchical levels, at least one hierarchical level being associated with a moderator for that level, the hierarchical levels including at least one city, the city including at least one neighborhood, the neighborhood including at least one house, and the house having at least one room.

4. A rich media communication system as defined in claim 3, wherein the person may drop a predetermined theater into the theater window to generate a custom theater window.

5. A rich media communication system as defined in claim 3, wherein the person may drop an avatar into the theater window to generate an avatar image within the stage.

6. A rich media communication system as defined in claim 3, wherein the theater includes a stage having a plurality of media targets, and rich media may be dropped on the stage for display in the media targets.

7. A rich media communication system as defined in claim 6, wherein media dropped onto the stage is presented in the first available media target.

8. A rich media communication system as defined in claim 6, wherein a still image is dropped onto a particular media target and the still image is shown presented in the particular media target.

9. A rich media communication system as defined in claim 6, wherein a video stream is dropped onto a particular media target and the video stream is shown presented in the particular media target.

10. A rich media communication system as defined in claim 6, wherein audio media dropped on the stage is played by the system.

11. A rich media communication system, comprising:

a theater having a background presentation scene with rich media targets, including capability to provide a non-real-life-equivalent background presentation scene, and having a selectable three-dimensional avatar representation associated with a particular person, the avatar representation being driven by visual sensing of geometric features of the particular person; and a player to present the theater at a remote location, wherein the particular person is at least one user of the rich media communication system, the rich media communication system further including:

a directory to organize rich media communications users into user-defined communities, each user being associated with their own respective independent theater having rich media content, the communities being organizable in hierarchical levels, at least one hierarchical level being associated with a moderator for that level, the hierarchical levels including at least one city, the city including at least one neighborhood, the neighborhood including at least one house, and the house having at least one room.

12. A rich media communication system as defined in claim 11, wherein the avatar representation may have selectable behaviors.

13. A rich media communication system as defined in claim 11, wherein the visual sensing is performed by a sensor using wavelet-based feature tracking.

14. A rich media communication system as defined in claim 13, wherein the tracking sensor may be trained with varying expressions of the person.

15. A rich media communication system as defined in claim 11, further comprising a module that allows construction of a personalized avatar representation which is based on an image of the person.

16. A rich media communication system, comprising:

a theater including a visual representation associated with a particular person; and a communicator to present the theater to a remote location using a rich media messaging directory service, and to communicate rich media content for the theater, wherein the particular person is at least one user of the rich media communication system, the rich media communication system further including:

a directory to organize rich media communications users into user-defined communities, each user being associated with their own respective independent theater having rich media content, the communities being organizable in hierarchical levels, at least one hierarchical level being associated with a moderator for that level, the hierarchical levels including at least one city, the city including at least one neighborhood, the neighborhood including at least one house, and the house having at least one room.

17. A rich media communication system, comprising:

a theater to provide rich media presentations which include a visual representation associated with a particular person, the theater being independent of other theaters that include visual representations associated with other persons; and an online directory to locate users capable of communicating with rich media presentations and to organize rich media communications users into user-defined communities, each user being associated with their own respective independent theater having rich media content, the communities being organizable in hierarchical levels, at least one hierarchical level being associated with a moderator for that level, the hierarchical levels including cities, the cities including neighborhoods, the neighborhoods including houses, and the houses having rooms.

18. A rich media communication system as defined in claim 17, wherein the directory includes a user's personalized address book.

19. A rich media communication system as defined in claim 17, wherein the directory includes a listing of users.

20. A rich media communication system as defined in claim 17, wherein the directory includes a rich media card having a user's rich media communication parameters for communicating with the user.

21. A rich media communication system as defined in claim 20, wherein the rich media card of a user may be transmitted to another user.

22. A rich media communication system as defined in claim 20, wherein a user's rich media card may be requested by another user.

23. A rich media communication system as defined in claim 17, wherein the directory includes user blocking wherein a user may block rich media communications from selected other users.

24. A rich media communication system, comprising:

a status window indicating rich media communications received, the user's visibility to other users, the user's availability to other users, and the user's automatic response to rich media communication messages from other users;

a theater having the status window and including a visual representation associated with a particular user;

a presentation control to allow capability to switch between different representations of the particular user during a session in the theater; and a directory to organize rich media communications users into user-defined communities, each user being associated with their own respective independent theater having rich media content, the communities being organizable in hierarchical levels, at least one hierarchical level being associated with a moderator for that level, the hierarchical levels including cities, the cities including neighborhoods, the neighborhoods including houses, and the houses having rooms.

25. A rich media communication system comprising:

a rich media client to communicate rich media communications between users;

a theater including a visual representation associated with a particular person;

a presentation control to allow capability to switch between different representations of the particular person during a session in the theater;

a directory to organize rich media communication users into user-defined communities, each user being associated with their own respective independent theater having rich media content;

wherein the communities are organized in hierarchical levels;

wherein predetermined hierarchical levels are associated with a user who acts as a moderator for the level; and wherein the hierarchical levels include cities, where the cities include neighborhoods, the neighborhoods include houses, and the houses have rooms.

26. A rich media communication system as defined in claim 25, wherein the moderator may control access to the associated level including blocking of a particular user accessing a room.

27. A rich media communication system, comprising:

a theater window having a representation associated with a particular person, the theater window having a stage onto which the particular person may direct rich media and being independent of other theater windows having representations associated with other persons;

a presentation control to allow capability to switch between different representations of the particular person during a session in the theater window;

wherein the particular person is at least one user of the rich media communication system, the rich media communication system further including:

a directory to organize rich media communications users into user-defined communities, each user being associated with their own respective independent theater window having rich media content, the communities being organizable in hierarchical levels, at least one hierarchical level being associated with a moderator for that level, the hierarchical levels including at least one city, the city including at least one neighborhood, the neighborhood including at least one house, and the house having at least one room; and a client to publish the theater window to a rich media website.

28. A rich media communication system, comprising:

a message center having a message reader, the message reader having a text message window and a rich media presentation window, wherein the rich media window may be toggled off such that a user may first read only the text message before requesting transmission of a rich media message for presentation in the presentation window;

a theater having the message center and including a visual representation associated with a particular person; and a directory to organize rich media communications users into user-defined communities, each user being associated with their own respective independent theater having rich media content, the communities being organizable in hierarchical levels, at least one hierarchical level being associated with a user who acts as a moderator for that level, the hierarchical levels including at least one city, the city including at least one neighborhood, the neighborhood including at least one house, and the house having at least one room.

29. A rich media communication system, comprising:
a monitor window that shows, to a particular person creating a rich media presentation, a live video image of the particular person with sensing control points overlaid on the particular person's image to show feature tracking performance; and
a presentation control to allow switching between this image of the particular person and at least one of a live video image of the particular person, or a blue screen cutout of the particular person,
wherein the particular person is at least one user of the rich media communication system, the rich media communication system further including:
a directory to organize rich media communications users into user-defined communities, each user being associated with their own respective independent monitor window having rich media content, the communities being organizable in hierarchical levels, at least one hierarchical level being associated with a moderator for that level, the hierarchical levels including at least one city, the city including at least one neighborhood the neighborhood including at least one house, and the house having at least one room.

30. A rich media communication system, comprising:
a server infrastructure to provide web hosting, message hosting and communication services;
at least one content client that includes an authoring tool to generate a rich media communication;
a theater including a visual representation associated with a particular person;
a plurality of communicator clients to display, using the server infrastructure, the rich media communication in the theater at remote locations,
wherein the particular person is at least one user of the rich media communication system, the rich media communication system further including:
a directory to organize rich media communications users into user-defined communities, each user being associated with their own respective independent theater having rich media content, the communities being organizable in hierarchical levels, at least one hierarchical level being associated with a moderator for that level, the hierarchical levels including at least one city, the city including at least one neighborhood, the neighborhood including at least one house, and the house having at least one room.

31. A rich media communication system as defined in claim 30, wherein the communicator client includes a message center, a renderer, and an encoder.

32. A method for generating and rendering rich media communications, the method comprising:
receiving media elements from a plurality of media sources and generating a multiplexed rich media communication bit stream having the media elements;
transmitting the bit stream to a receiver;
decomposing the bit stream into separate rich media elements;
rendering the rich media elements to generate a rich media theater, the theater including a visual representation associated with a particular user; and
organizing rich media communications users in a directory of user-defined communities, each user being associated with their own respective independent theater having rich media elements, the communities being organizable in hierarchical levels, at least one hierarchical level being associated with a moderator for that level, the hierarchical levels including at least one city, the cities including at least one neighborhood, the neighborhood including at least one house, and the house having at least one room.

33. A method for rich media communication, the method comprising:
providing a theater window having a background presentation scene;
selecting a particular character for a presentation in the theater window, wherein the presentation of the particular character may be selected from a three-dimensional avatar, a blue screen cutout of the particular character, an audio presentation, or a plain video presentation;
providing capability to switch between different presentations of the particular character during a session in the theater window; and
organizing rich media communications users in a directory of user-defined communities, each user being associated with their own respective independent theater window having rich media content, the communities being organizable in hierarchical levels, at least one hierarchical level being associated with a moderator for that level, the hierarchical levels including cities, the cities including neighborhoods, the neighborhoods including houses, and the houses having rooms.

34. A method for rich media communication, the method comprising:
providing a theater window having a representation associated with a particular user;
providing a media target in the theater window onto which the particular user may direct media and which is independent of other theater windows of other users;
presenting the theater window to a remote location; and
organizing rich media communications users in a directory of user-defined communities, each user being associated with their own respective independent theater window having rich media content, the communities being organizable in hierarchical levels, at least one hierarchical level being associated with a moderator for that level, the hierarchical levels including at least one city, the cities including at least one neighborhood, the neighborhood including at least one house, and the house having at least one room.

35. A method for rich media communication, the method comprising:
providing a theater having a background presentation scene with rich media targets, including providing capability to select a background presentation scene that contains a non-real-life-equivalent background;
generating in the theater an avatar representation associated with a particular user;
driving the avatar representation by visual sensing of the particular user;
presenting the theater including the avatar representation at a remote location; and
organizing rich media communications users in a directory of user-defined communities, each user being associated with their own respective independent theater window having rich media content, the communities being organizable in hierarchical levels, at least one hierarchical level being associated with a moderator for that level, the hierarchical levels including cities, the cities including neighborhoods, the neighborhoods including houses, and the houses having rooms.

36. A method for rich media communication, the method comprising:
providing a theater including selectable visual representations associated with a particular user;
presenting the theater to a remote location using a rich media messaging directory service;
allowing switching between different visual representations of the particular user during a session in the theater; and
organizing rich media communications users in a directory of user-defined communities, each user being associated with their own respective independent theater window having rich media content, the communities being organizable in hierarchical levels, at least one hierarchical level being associated with a moderator for that level, the hierarchical levels including at least one city, the cities including at least one neighborhood, the neighborhood including at least one house, and the house having at least one room.

37. A method for rich media communication, the method comprising:
providing rich media presentations which include a visual representation associated with a particular person, including providing capability to select a three-dimensional avatar representation of the person based on sensed geometric features of the person;
allowing switching between different visual representations of the particular person during a session;
locating users capable of communicating with the rich media presentations using an online directory; and
organizing such users in user-defined communities in the online directory, each user being associated with their own respective independent theater having rich media content, the communities being organizable in hierarchical levels, at least one hierarchical level being associated with a moderator for that level, the hierarchical levels including cities, the cities including neighborhoods, the neighborhoods including houses, and the houses having rooms.

38. A method of rich media communication, the method comprising:
providing a theater window having a representation associated with a particular user, the theater window having a stage onto which the particular user may direct rich media, the theater window being independent of other theater windows having stages on which other users may direct rich media;
publishing the theater window to a rich media website; and
organizing rich media communications users in a directory of user-defined communities, each user being associated with their own respective independent theater window having rich media content, the communities being organizable in hierarchical levels, at least one hierarchical level being associated with a moderator for that level, the hierarchical levels including at least one city, the cities including at least one neighborhood, the neighborhood including at least one house, and the house having at least one room.

39. A rich media communication system, comprising:
a theater having a background presentation scene with rich media targets and having an avatar representation associated with a user, the avatar representation being driven by visual sensing of the particular user;
a sensor to perform the visual sensing by using wavelet-based feature tracking;
a player to present the theater at a remote location, and
a directory to organize rich media communications users into user-defined communities, each user being associated with their own respective independent theater window having rich media content, the communities being organizable in hierarchical levels, at least one hierarchical level being associated with a user who acts as a moderator for that level, the hierarchical levels including at least one city, the city including at least one neighborhood, the neighborhood including at least one house, and the house having at least one room.

40. The rich media communication system of claim 39 wherein the sensor may be trained with varying expressions of the person.

41. A rich media communication system, comprising:
a theater having a background presentation scene with rich media targets and having an avatar representation associated with a particular person, the avatar representation being driven by visual sensing of the particular person;
a player to present the theater at a remote location;
a module that allows construction of a personalized avatar representation which is based on an image of the particular person;
wherein the particular person is at least one user of the rich media communication system, the rich media communication system further including:
a directory to organize rich media communications users into user-defined communities, each user being associated with their own respective independent theater having rich media content, the communities being organizable in hierarchical levels, at least one hierarchical level being associated with a moderator for that level, the hierarchical levels including at least one city, the city including at least one neighborhood, the neighborhood including at least one house, and the house having at least one room.

42. The rich media communication system of claim 41, further comprising a sensor to perform the visual sensing using wavelet-based feature tracking.

43. A system, comprising:
a means for providing an independently customizable theater window having a representation associated with a particular user;
a means for providing a media target in the theater window onto which the particular user may direct media; and
a means for presenting the theater window to a remote location; and
a means for organizing rich media communications users in a directory of user-defined communities, each user being associated with their own respective independent theater having rich media content, the communities being organizable in hierarchical levels, at least one hierarchical level being associated with a moderator for that level, the hierarchical levels including at least one city, the cities including at least one neighborhood, the neighborhood including at least one house, and the house having at least one room.

44. The system of claim 43, further comprising:
a means for receiving media elements from a plurality of media sources and generating a multiplexed rich media communication bit stream;

a means for transmitting the bit stream to a receiver;
a means for decomposing the bit stream into rich media elements; and
a means for rendering the rich media elements to generate the theater.

45. The system of claim 43, further comprising additional means for operating and for providing additional features for the theater.

* * * * *